United States Patent [19]
Sauerwein et al.

[11] Patent Number: 5,437,516
[45] Date of Patent: Aug. 1, 1995

[54] SURFACE DRAINAGE APPARATUS

[75] Inventors: Heinrich Sauerwein, Nubbel; Wolfgang Arm, Rendsburg; Jan Witt, Eckernforde, all of Germany

[73] Assignee: ACO Severin Ahlmann GmbH & Co., KG, Rendsburg, Germany

[21] Appl. No.: 161,223

[22] Filed: Dec. 3, 1993

[30] Foreign Application Priority Data

Dec. 10, 1992 [DE] Germany .................. 42 41 706.6

[51] Int. Cl.6 ............................................. E01C 11/22
[52] U.S. Cl. ............................................. 404/2; 404/3; 404/4; 411/508; 411/509; 411/510
[58] Field of Search ............... 404/2, 3, 4, 5; 52/169.5, 11, 20; 49/463, 465, 41; 411/338, 339, 508, 509, 510; 24/297, 666, 668

[56] References Cited

FOREIGN PATENT DOCUMENTS

0081762B1 2/1982 European Pat. Off. .
81741A1 6/1983 European Pat. Off. .
0204278A2 12/1986 European Pat. Off. .
0476672A1 3/1992 European Pat. Off. .
3133658A1 6/1982 Germany .

Primary Examiner—Ramon S. Britts
Assistant Examiner—Pamela A. O'Connor
Attorney, Agent, or Firm—Marshall, O'Toole, Gerstein, Murray & Borun

[57] ABSTRACT

Surface drainage apparatus is provided comprising a channel body defining a drainage channel and a cover for the channel. A fixing means is provided for attachment of the cover to the channel body and comprises a first fixing element for attachment to the channel body and a complementary second fixing element for attachment to the cover. The first fixing element comprises a clamping spring defining a receiving opening and the second fixing element comprises a peg formed with an enlarged end that is a leading end for insertion of the peg into the clamping spring. The clamping spring and the peg are constructed so that the peg can be inserted into the receiving opening, thereby elastically deforming the spring, and retained therein after insertion in a direction substantially perpendicular to the plane of the cover.

11 Claims, 7 Drawing Sheets

SURFACE DRAINAGE APPARATUS

FIELD OF THE INVENTION

The present invention relates to surface drainage apparatus.

DESCRIPTION OF THE PRIOR ART

Conventional drainage apparatus comprising a drainage channel is known in which a cover is fixed to a channel body by screws. This form of attachment necessitates both expensive manufacture and laborious assembly.

In European patents EP 204 278 A2 and EP 476 672 A1 and in German patent DE 31 33 658 A1 surface drainage apparatuses are described in which the fixation mechanisms do not involve screws. As a result, it is easier to set the cover in place and to remove it. However, these known arrangements are rather complicated. Furthermore, the components involved must be produced with low tolerances.

SUMMARY OF THE INVENTION

The object of the present invention is to provide a surface drainage apparatus which is can be easily produced and assembled when compared with similar prior art arrangements.

According to the present invention there is provided surface drainage apparatus comprising a channel body defining a drainage channel, a cover for the drainage channel, a fixing means for attachment of said cover to said channel body and comprising a first fixing element for attachment to said channel body and a complementary second fixing element for attachment to said cover, one of said first and said second fixing elements comprising a clamping spring defining a receiving opening, and the other of said first and said second fixing elements comprising a peg formed with an enlarged end that is a leading end for insertion of said peg into said clamping spring, and said clamping spring and said peg being constructed so that said peg can be inserted into said receiving opening, thereby elastically deforming the spring, and retained therein after insertion in a direction substantially perpendicular to the plane of the cover.

Thus the invention provides a simple clamping device to fix the cover to the drainage channel. Surprisingly, it has been found that the holding forces provided by such a simple device are sufficient to prevent the cover from being lifted off the channel body when the it is driven over by a vehicle.

While it is preferred that the first fixing element comprises the clamping spring and the second fixing element comprises the peg, it is of course possible to reverse the arrangement of clamping spring and peg, with respect to cover and channel body.

Preferably, the enlarged end of the peg is bi-conical in form with a first vertex at said leading end and a second vertex pointing away from said leading end at a less acute angle than said first vertex. As a result, the forces necessary for assembly are lower than those for removal of the cover.

Preferably also, the receiving opening is of elongate shape and said peg can be inserted therein at any point along the length of said receiving opening. As a result, the peg can be inserted at any desired site along the long axis of the receiving opening, so that the process tolerances of channel and cover can be relatively high.

Preferably also, the clamping spring is attached to the channel body with sufficient play that the peg can move the clamping spring during insertion into the receiving opening. This, again, serves to permit large tolerances in the production of channel and cover.

Preferably also, the receiving opening is of elongate shape and the peg can be inserted therein at any point along the length of the receiving opening, and the clamping spring is attached to said channel body with sufficient play in a direction perpendicular to the long axis of the receiving opening so that the peg can move the clamping spring in a direction perpendicular to the long axis during insertion into the receiving opening. The two degrees of freedom are thus ensured in different ways, which results in a very stable structure.

Preferably also, the clamping spring substantially comprises a ribbon shaped to define an open looped portion and two opposed curved retaining sections, each of which is continuous at one end with an end of the looped portion and curved outwards of the looped portion at its other end, and the clamping spring is seated in such a way that the outwardly curving other ends of the clamping spring overlap opposite edges defining its seating. This arrangement both makes assembly very simple and ensures that the clamping spring can be displaced.

When it is desired to ensure greater retaining forces for the cover, the peg is preferably rotatable about its long axis and the enlarged end has two surfaces on opposite sides thereof which are spaced by a distance substantially equal to the diameter of the enlarged end so that when said surfaces are apposed to the retaining sections of the clamping spring the peg expands the clamping spring to permit the peg to be withdrawn from the clamping spring via the receiving opening. With suitable dimensioning of both the conical angles of the enlarged end of the peg and of the opening within which the clamping spring is seated, it can be made impossible for the peg to become disengaged. In this case, the cover can be lifted away from the channel body only if the peg is rotated.

The site of attachment of the clamping spring can be a cross-bar anchored to the channel body or in a receiving opening formed in the channel body itself. Alternatively, the clamping spring can be attached to a metal frame, which is provided to reinforce an upper edge of the channel body and on which the cover rests, such a frame being described in European patent EP 81 762 C1. In this case it is advantageous to attach the clamping spring to a flat member which can be inserted into a side receiving opening or pocket in the frame. It is further advantageous for the cover to comprise a retaining lug that prevents the flat member from slipping out of the pocket when the cover is seated over the channel in the channel body.

The present invention will now be described by way of example with reference to the accompanying drawings.

DESCRIPTION OF THE PREFERRED EMBODIMENTS

Figure 1:
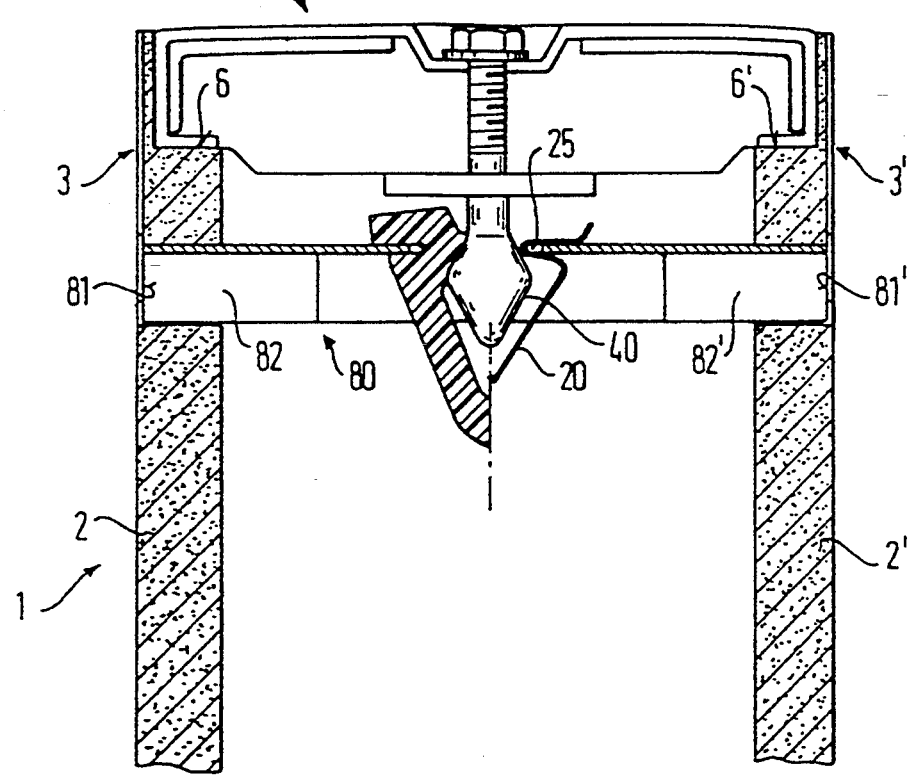
FIG. 1 is a vertical cross section through a first embodiment of part of a drainage channel according to the invention.

In the following description the same elements or parts with the same function are identified by the same reference numerals.

Figure 2:
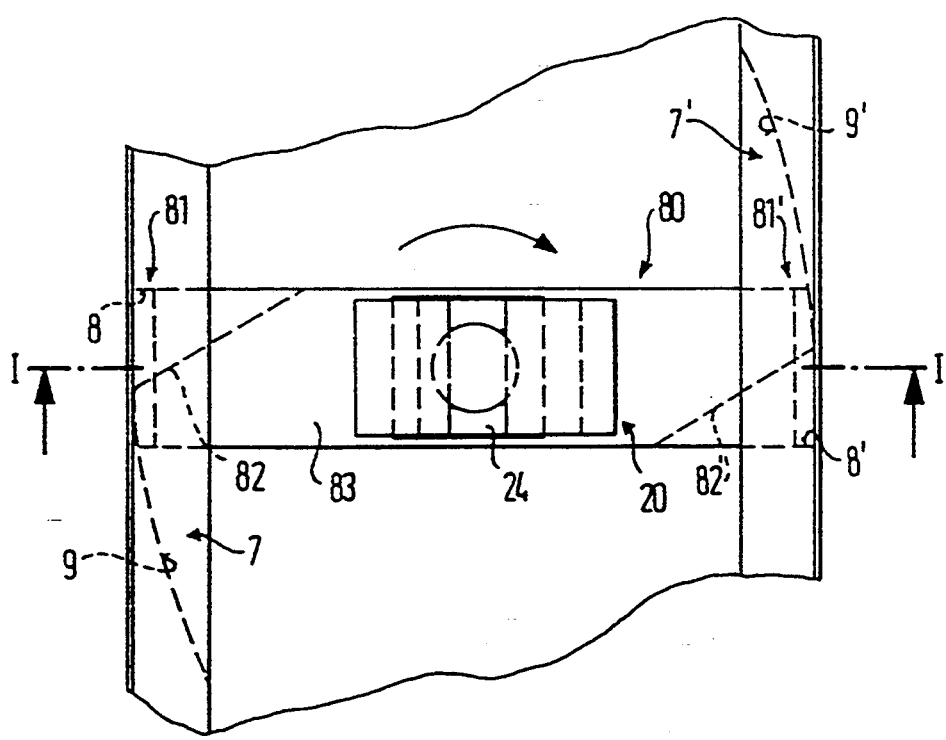
FIG. 2 is a plan view of the channel shown in FIG. 1.
Figure 5:
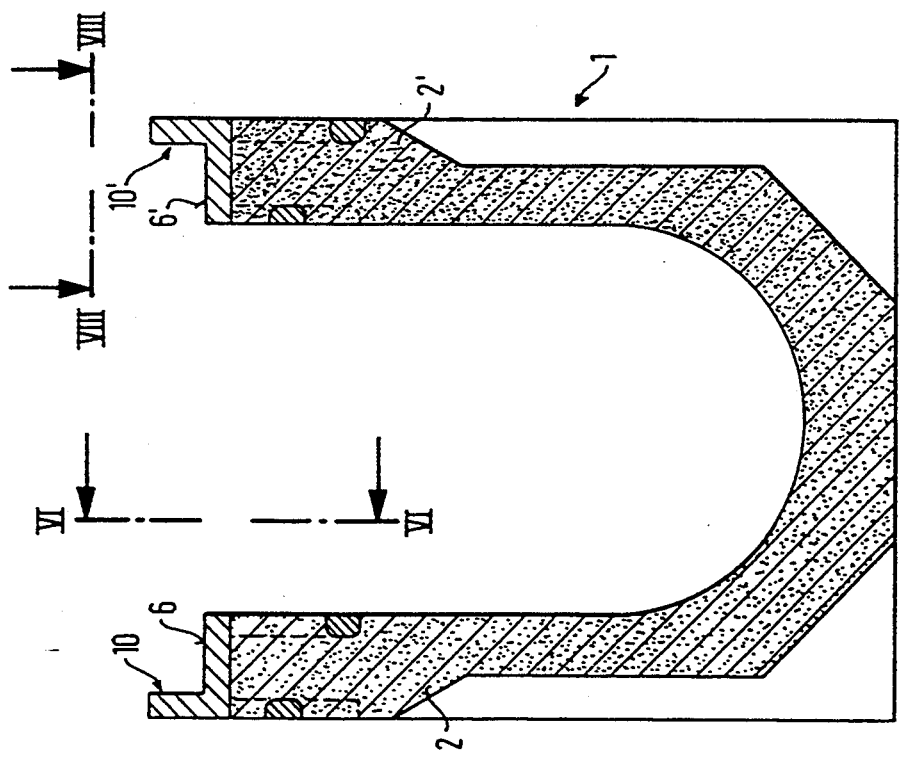
FIG. 5 is a transverse cross section of a channel body with an attached frame.

In FIGS. 1, 2 and 5 a drainage channel body 1 is shown, the side walls 2, 2' of which are provided with cutouts 7, 7' just below an upper edge 3, 3' or a support surface 6, 6' for a cover 30. The cutouts 7, 7' are defined by a front wall 8, 8' and a back wall 9, 9' which is set at an angle. The two cutouts 7, 7' are offset by an amount corresponding to the width of a cross-bar 80.

The cross-bar 80 has at its ends 81, 81 ' clamping devices 82, 82' which can spread out into the cutouts 7, 7' when the cross-bar 80 has been set into place. A similar channel body to this, although without the cross-bar 80, is described in, for example, European patent EP 81 741 C1.

Figure 3:
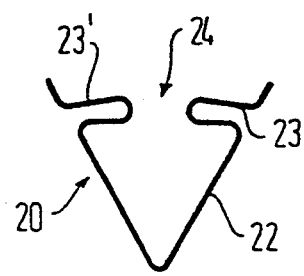
FIG. 3 is a side view of a first embodiment of a clamping spring.

The cross-bar 80 defines, in a base area 83, a substantially rectangular opening 25 in which is seated a first fixing element 20 comprising a clamping spring. The clamping spring 20, as shown in FIG. 3, comprises a lower spring portion 22, which is looped into a substantially V-shape. Alternatively, it could be made U-shaped or semicircular. At the upper end of the clamping spring 20 retaining sections 23, 23' are provided which are substantially U-shaped in cross section and each of which is integral by means of one of its limbs with one limb of the lower looped spring portion 22. The openings of the retaining sections 23, 23' face outward, so that between the two sections an elongated receiving opening 24 is formed. These clamping springs can be made of a ribbonlike metal strip, as shown in the right half of FIG. 1, or of a plastics material, as shown in the left half of FIG. 1.

The clamping spring 20 is located in the opening 25 in the cross-bar 80 in such a way that the limbs of the retaining sections 23, 23' overlap the edge of the opening 25. The components of this arrangement are dimensioned so that the clamping springs 20 can be displaced to the left and to the right, as shown in FIGS. 1 and 2, so that the edges defining the opening 25 can overlap the retaining sections 23, 23' to a greater or lesser extent.

Figure 4:
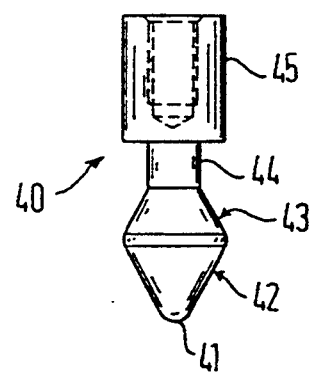
FIG. 4 is a side view of a first embodiment of a fixing element.
Figure 7:
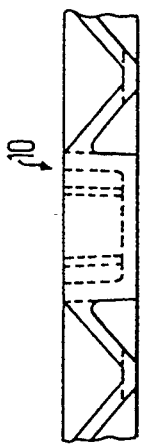
FIG. 7 is a view along the line VII—VII in FIG. 6.

Attached to the cover 30 is a second fixing element 40 of the fixing means which is complementary to the first fixing element 20. The fixing element 40 is in the form of a peg that, as shown in FIG. 4, defines a biconical enlarged end with a tip 41 at the end of a conical surface 42. The conical surface 42 is continuous with a conical retaining surface 43 that slants in the opposite direction, the angle of the retaining surface 43 being greater than that of the conical surface 42. The retaining surface 43 in turn is continuous at its narrow end with a shaft 44, at the end of which a broadened head 45 is attached. This fixing element 40 is, as shown in FIG. 1, fastened to the cover 30 by a screw.

When the cover 30 is placed over the channel 1, the tip 41 of the fixing element 40 is inserted into the receiving opening 24 and, if it is not quite centered, shifts the complementary fixing element or clamping spring 20 to the right or left, so that the receiving opening 24 becomes symmetrically disposed with respect to the long axis of the fixing element 40. Because of the elongated shape of the receiving opening 24, it makes essentially no difference at which end of the receiving opening 24 the fixing element 40 is inserted. Downward pressure expands the lower spring portion 22, so that the retaining sections 23, 23' move outward and the receiving opening 24 becomes wider, until the conical surface 42 has been pushed completely into the receiving opening 24. As the fixing element 40 is pushed further inward, the lower spring portion 22 comes together again so that the receiving opening 24 slides along the retaining surface 43 until the cover 30 is seated securely on the support surfaces 6, 6'. The dimensions of the components here are such that when the cover 30 is fixed in place, the position of the retaining sections 23, 23' with respect to the retaining surface 43 is as shown in FIG. 1; that is, an automatic spring adjustment can take place to ensure correct orientation and positioning of the components to one another takes place. Furthermore, the angle of the conical surface 42 is chosen so that a greater force is needed to pull the fixing element 40 out of the clamping spring 20.

In the first embodiment of drainage channel body 1, shown in FIG. 5, metal frames 10, 10' are cast into it at its upper edges, as is conventional.

Figure 6:
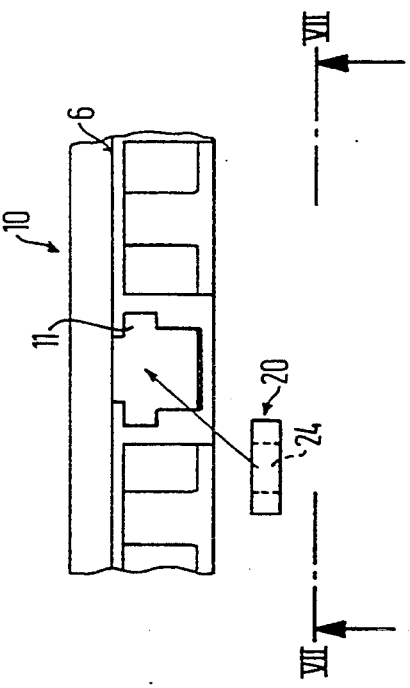
FIG. 6 is a view along the line VI—VI in FIG. 5.
Figure 8:
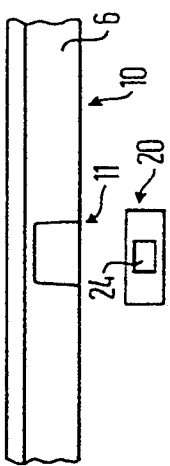
FIG. 8 is a view along the line VIII—VIII in FIG. 5.
Figure 9:
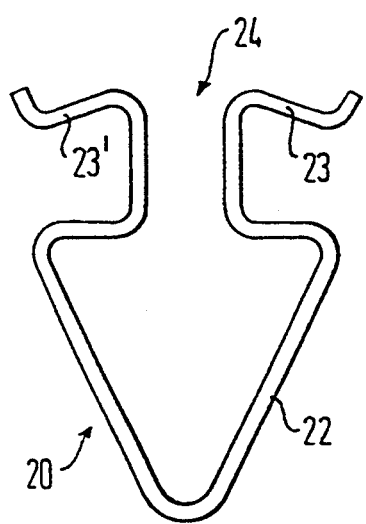
FIG. 9 is a side view of a second embodiment of a clamping spring.

The frames 10, 10', as shown in FIG. 6, define receiving openings or pockets 11 into which first fixing elements 20 in the form of flat members or strips can be inserted. These members define rectangular receiving openings 25. Into these receiving openings 25, clamping springs similar to those shown substantially to scale in FIG. 9, can be inserted. In principle the clamping springs shown in FIG. 9 can be identical in structure to those shown in FIG. 3. In another embodiment of the invention, as shown in FIGS. 13 to 18, the opening 25 is formed directly in the frame 10.

Figure 12:
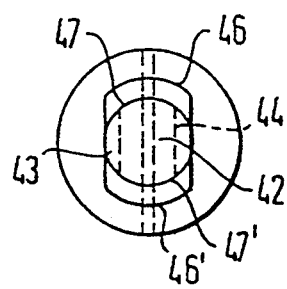
FIG. 12 is a view along the line XII—XII in FIG. 11.
Figure 10:
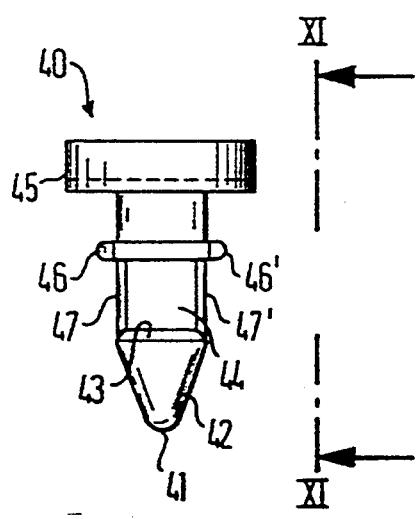
FIG. 10 is a side view of a second embodiment of a fixing element.
Figure 11:
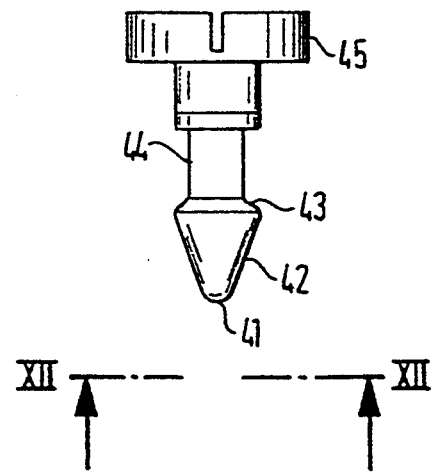
FIG. 11 is a view along the line XI—XI in FIG. 10.
Figure 13:
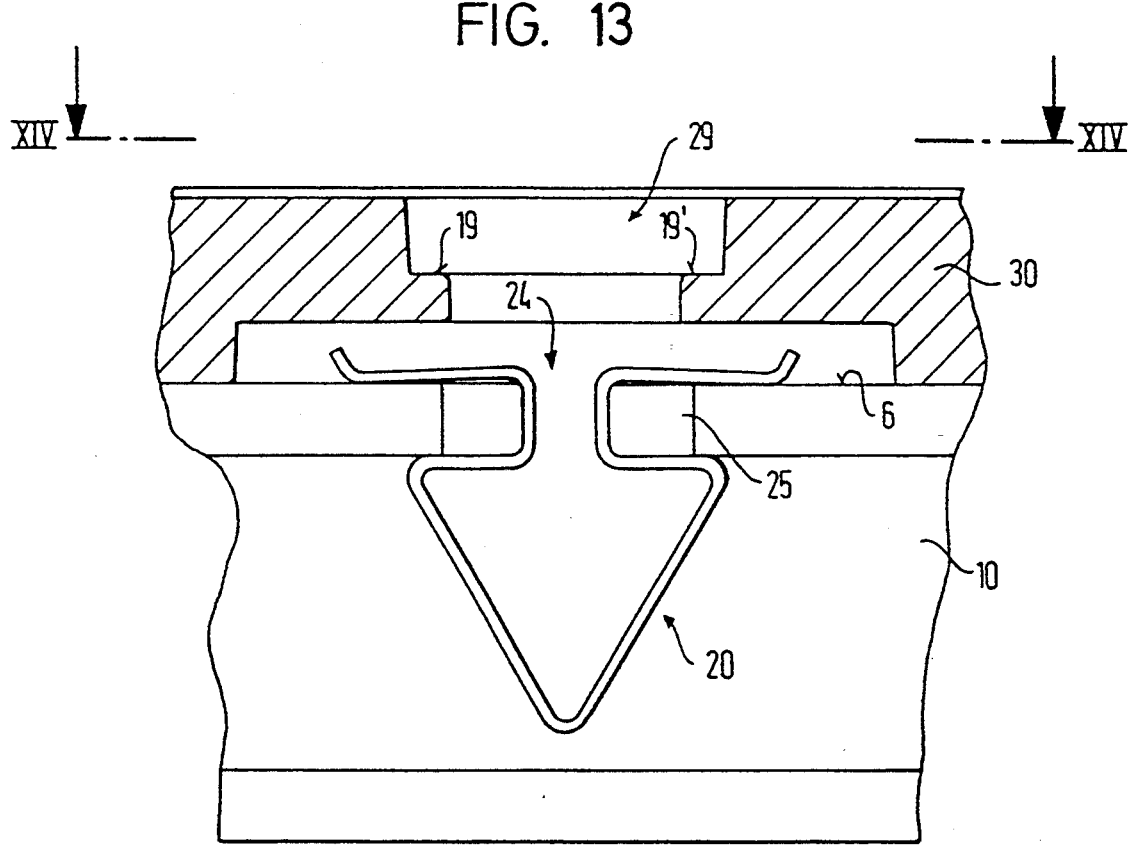
FIG. 13 is a partial longitudinal section through a drainage channel with a cover in place.
Figure 14:
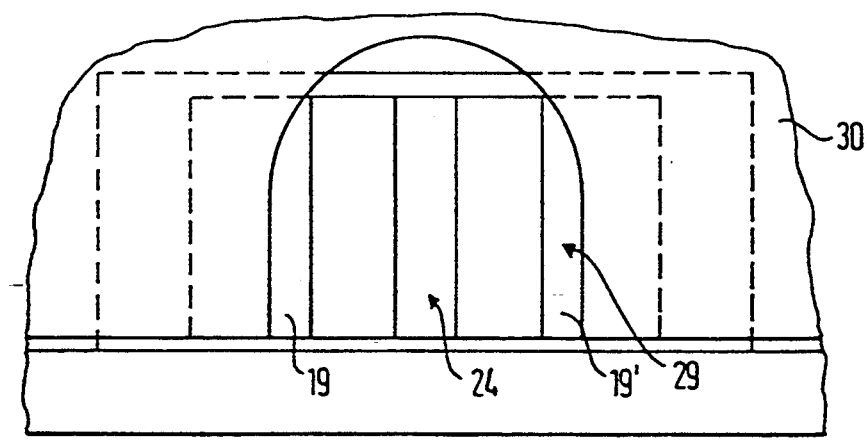
FIG. 14 is a view along the line XIV—XIV in FIG. 13.
Figure 15:
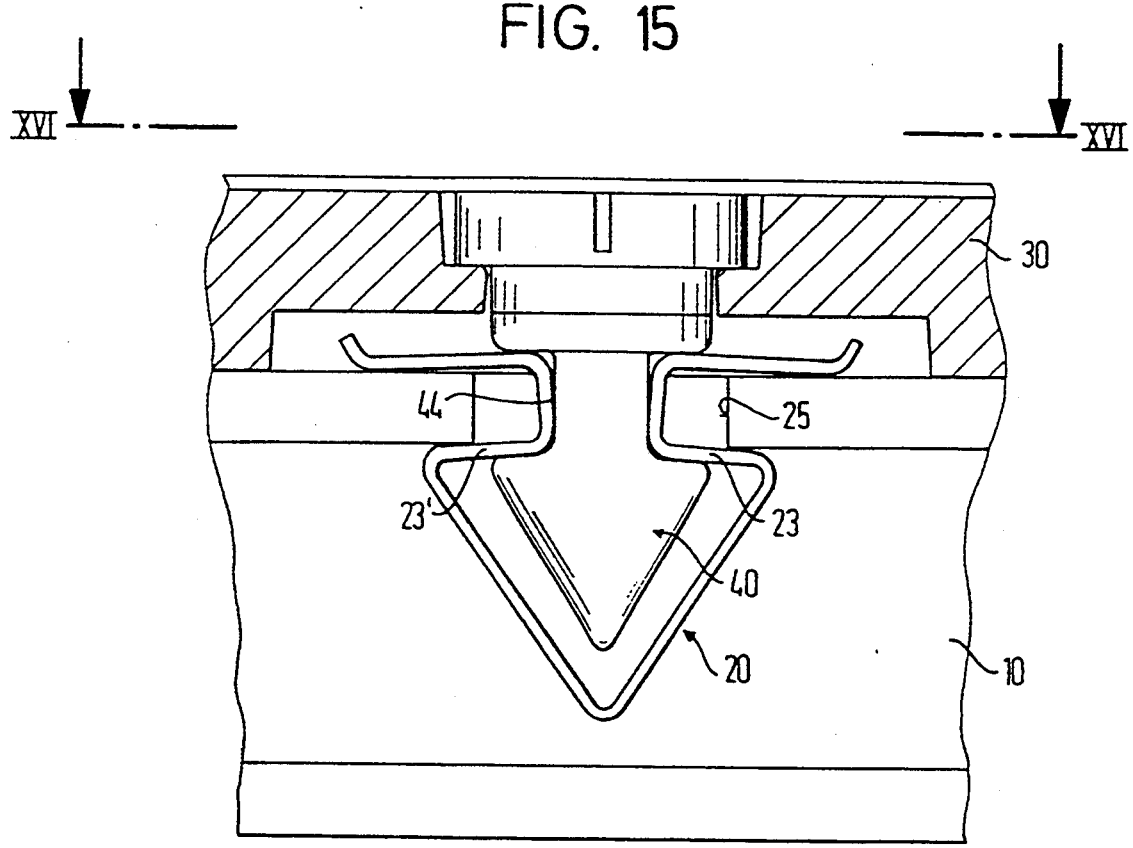
FIG. 15 is a view similar to that of FIG. 13 but with a fixing element inserted.

In the cover 30 a receiving aperture 29 is provided, as shown in FIGS. 13 and 14, through which a fixing element 40, as shown in FIGS. 10 to 12, can be inserted into the opening 24 until its broadened head 45 abuts against a stop surface 19 defining the receiving aperture 29. This position is shown in FIG. 15. Here the retaining portions 23, 23' are seated on the steeply angled retaining surface 43 in such a way that it is practically impossible to pull the fixing element 40 out of the clamping spring 20.

The fixing element 40 for this purpose as shown in FIGS. 10 to 12 is not radially symmetrical shape like the fixing element shown in FIG. 4. Instead it has two expansion surfaces 47, 47' which have substantially the same diameter as the conical surface 42 at its enlarged end. These expansion surfaces 47, 47' are disposed directly opposite one another. At a 90° angle to them the peg is indented to form the retaining surface 43 and the shaft 44, resulting in the configuration shown in FIGS. 10 to 12.

Figure 16:
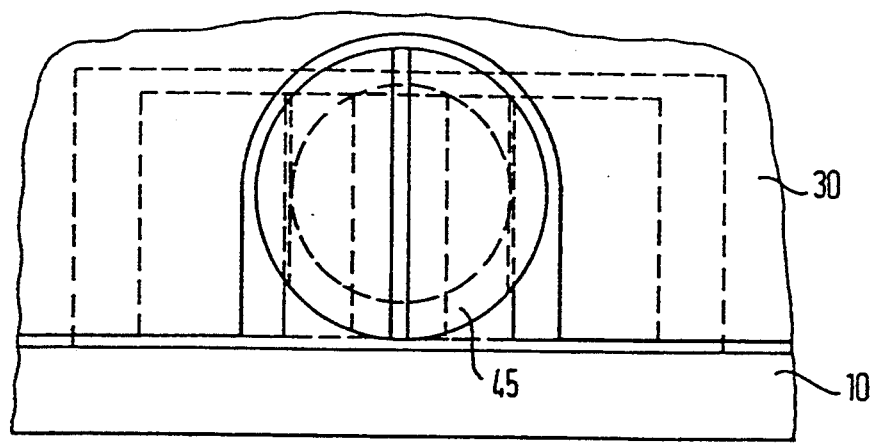
FIG. 16 is a view along the line XVI—XVI in FIG. 15.
Figure 17:
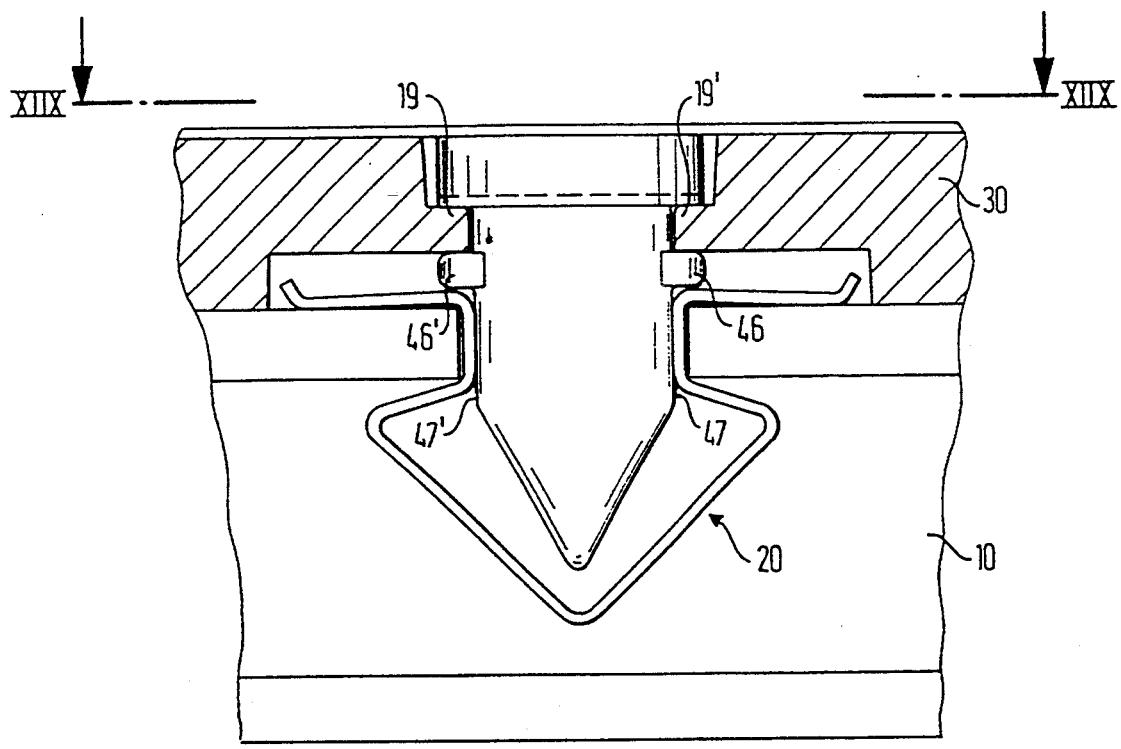
FIG. 17 is a view similar to that of FIG. 15 but with the fixing element rotated.
Figure 18:
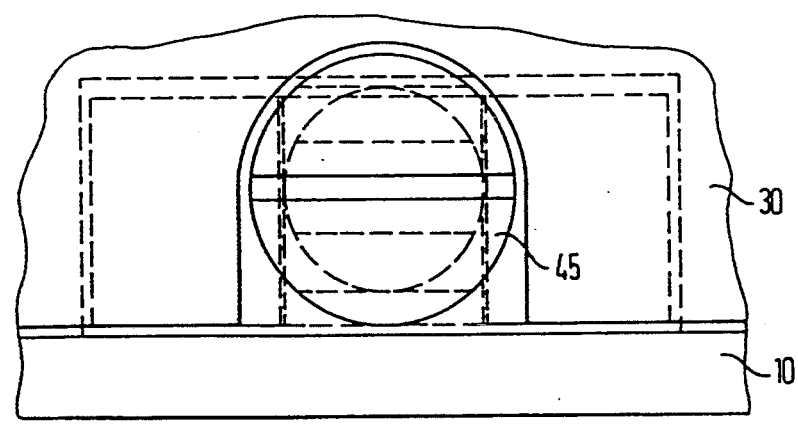
FIG. 18 is a view along the XVIII—XVIII in FIG. 17.

When this fixing element 40 is rotated through 90° out of the position shown in FIGS. 15 and 16, the position shown in FIGS. 17 and 18 results. In this latter position the expansion surfaces 47, 47' expand the clamping spring so that the cover 30 can be lifted away. To put the cover 30 in place, it makes no difference, in principle, which rotational position the fixing element 40 is in.

An additional feature of this embodiment is that the fixing element 40 is provided with retaining lugs 46, 46' which, when the fixing element 40 is rotated into the position shown in FIG. 17, project below the stop surfaces 19, 19' to keep the element 40 from falling out of the receiving aperture 29. When the element 40 is rotated into the position shown in FIGS. 15 and 16, the lugs 46 and 46' are no longer under the stop surfaces 19, 19' (FIG. 14) but rather are within the receiving aperture 29. Thus the fixing elements 40 can be inserted into a cover 30 and captively retained there.

Instead of the expansion surfaces 47, 47' shown in FIGS. 10 and 12, it is also possible to provide sections in which the retaining surface 43 and corresponding parts of the conical surface 42 are eliminated by extension of the shaft 44 to form parallel plane surfaces. However, the variant shown in FIGS. 10 to 12 is preferred inasmuch as an unintentional rotation of the fixing element 40 into an unfastened open position is prevented because such rotation would require expansion of the clamping spring.

What is claimed is:

1. Surface drainage apparatus comprising
    a channel body defining a drainage channel,
    a cover disposed within an opening in the drainage channel,
    a fixing means for attachment of said cover to said channel body and comprising a first fixing element attached to said channel body and a complementary second fixing element attached to said cover,
    one of said first and second fixing elements comprising a clamping spring defining a receiving opening,
    the other of said first and said second fixing elements comprising a peg formed with an enlarged end that is a leading end for insertion of said peg into said clamping spring, and
    said peg having a transverse dimension greater than said receiving opening, thereby elastically deforming the spring upon insertion of said enlarged end into said receiving opening, and said peg being retained within said clamping spring after insertion in a direction substantially perpendicular to the plane of the cover.

2. Apparatus as claimed in claim 1, wherein said enlarged end is bi-conical in form with a first vertex at said leading end and a second vertex pointing away from said leading end at a less acute angle than said first vertex.

3. Apparatus as claimed in claim 1, wherein said receiving opening is of elongate shape and said peg can be inserted therein at any point along the length of said receiving opening.

4. Apparatus as claimed in claim 1, wherein said clamping spring is attached to said channel body with sufficient play wherein said peg can move said clamping spring during insertion into said receiving opening.

5. Apparatus as claimed in claim 1, wherein said receiving opening is of elongate shape and said peg can be inserted therein at any point along the length of said receiving opening, and said clamping spring is attached to said channel body with sufficient play in a direction perpendicular to the long axis of said receiving opening so that said peg can move said clamping spring in a direction perpendicular to said long axis during insertion into said receiving opening.

6. Apparatus as claimed in claim 1, wherein said clamping spring substantially comprises a ribbon shape to define an open looped portion and two opposed curved retaining sections, each of which is continuous at one end with an end of said looped portion and curved outwards of said looped portion at its other end, and wherein said clamping spring is seated in such a way that said outwardly curving other ends of said clamping spring overlap opposite edges defining its seating.

7. Apparatus as claimed in claim 6, wherein said peg can be rotated about its long axis and said enlarged end has two surfaces on opposite sides thereof which are spaced by a distance substantially equal to the diameter of said enlarged end so that when said surfaces are apposed to said retaining sections of said clamping spring said peg expands said clamping spring to permit said peg to be withdrawn from said clamping spring via said receiving opening.

8. Apparatus as claimed in claim 1, comprising a cross-bar attached to said channel body and in which said clamping spring is mounted.

9. Apparatus as claimed in claim 1, comprising a frame which is located at an upper edge defined by said channel body as a reinforcement to support the cover.

10. Apparatus as claimed in claim 9, wherein a side of said frame defines a pocket and wherein said clamping spring is located in a flat member that can be inserted into said pocket.

11. Apparatus as claimed in claim 10, wherein said cover comprises a retaining lug that prevents said flat member from slipping out of said pocket.

* * * * *